Oct. 26, 1937.  H. R. ANDREW  2,097,360
WATER METER
Filed Dec. 19, 1935  2 Sheets-Sheet 1

Inventor
H. R. Andrew,

By Clarence A. O'Brien and
Hyman Berman
Attorneys

Oct. 26, 1937.   H. R. ANDREW   2,097,360
WATER METER
Filed Dec. 19, 1935   2 Sheets-Sheet 2.
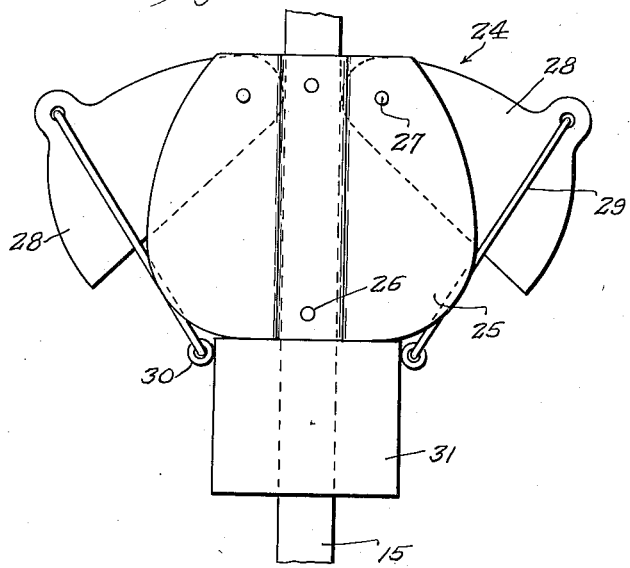
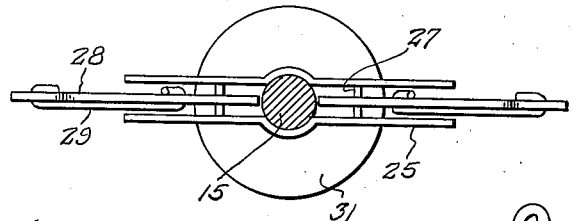
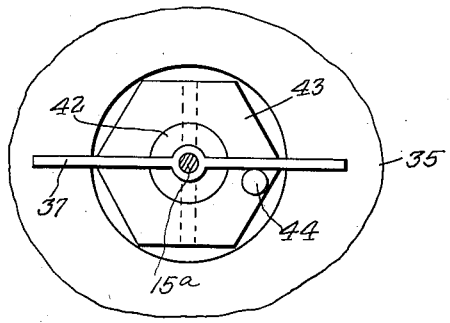
Inventor
H. R. Andrew,
By Clarence A. O'Brien and
Hyman Berman  Attorneys Patented Oct. 26, 1937

2,097,360

UNITED STATES PATENT OFFICE 2,097,360

WATER METER

Harry R. Andrew, Roswell, N. Mex.

Application December 19, 1935, Serial No. 55,262

2 Claims. (Cl. 73—230)

This invention relates to meters for measuring the flow of water and the meter of the present invention is particularly designed for use in measuring the flow of water in terms of cubic feet or gallons from very low pressure wells.

Among the objects of the invention are to provide in a meter of this character an improved drive mechanism for the gear-train of a conventional meter structure; to provide an improved governor structure forming part of the aforesaid drive means; and in general to provide a meter unit simple in installation and construction and economical to use.

The invention together with its objects and advantages will be best understood from a study of the following description taken in connection with the accompanying drawings wherein:

Figure 2 is an enlarged elevational view of the governor.

Figure 3 is a top plan of the governor the drive shaft being shown in section.

Figure 4 is a fragmentary detail view showing the connection between the drive shaft and the gear train for transmitting movement from the drive shaft to the train, and Figure 5 is a perspective view of a connecting link.

Figure 1:
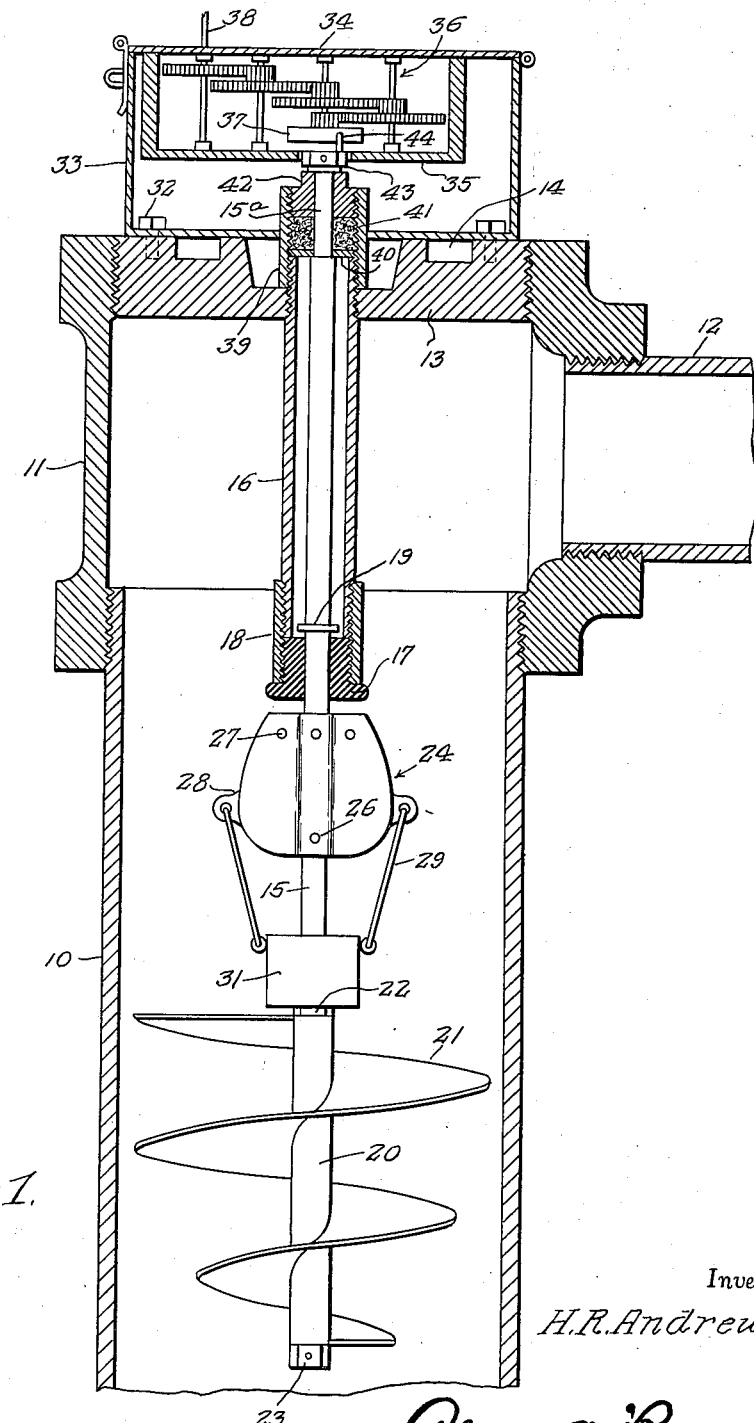
Figure 1 is an enlarged view partly in section and partly in elevation illustrating the application of the invention.

Referring to the drawings by reference numerals it will be seen that 10 indicates generally a pipe serving in the present instance as an intake pipe for the housing 11 in one end of which the pipe 10 is threaded. Threaded into one side of the housing 11 is a pipe 12 which serves as an outlet pipe for the housing, the arrangement just described being so placed in the water conduit of the well pump that the water pumped from the well will pass through the pipe 10 into the housing 11 and from the housing 11 through the pipe 12 to the point of use.

Threaded into the top of the housing 11 is a plug-cap 13 provided in its top side with sockets 14 for accommodating a spanner wrench or similar tool to facilitate removal and placement of the plug-cap 13.

A drive shaft 15 has an upper portion journaled within a tubular casing 16 one end of which is threaded through a central opening in the plug-cap 13.

The drive shaft 15 at the lower end of the tubular casing 16 works through a bushing 17 of rubber or other elastic material secured in abutting relation to the lower end of the casing 16 through the medium of a coupling sleeve 18 which is screw threadedly engaged with the casing 16 and the bushing 17 as clearly shown in Figure 1. Above the bushing 17 the shaft 15 is provided with a safety collar 19 as shown. Collar 19 is provided to engage the bushing 17 to limit downward movement of shaft 15 in the event of breakage occurring in the shaft above the collar.

On the lowermost end of the drive shaft 15 is a longitudinally tapered screw impeller which comprises a tubular hub 20 having integral therewith or otherwise secured thereto a spiral vane 21. The hub 20 of the impeller is secured to the shaft 15 in any suitable manner and is confined on the shaft between a collar 22 and a lower lock nut 23. Thus it will be seen that water flowing through the pipe 10 will impinge upon the vanes 21 so as to drive the shaft 15.

Also mounted on the shaft 15 between the casing 16 and the aforementioned impeller is a governor indicated generally by the reference numeral 24.

As best shown in Figures 2 and 3, the governor 24 comprises a housing in the form of a pair of complemental spaced plates 25 secured at opposite sides of the shaft 15 as at 26. Pivoted between corresponding portions of the plates 25 at opposite sides of the shaft 15, and as indicated generally at 27 are substantially segmental shaped weights or governor arms 28, the weights 28 being pivoted near their respective upper ends as shown.

On the arcuate edges thereof adjacent the free end of the arms or weights 28, the same are provided with outstanding apertured lugs which receive, respectively, a hook-end of a link 29.

The links 29 have additional hook-ends which are engaged with eyes 30 on opposite sides of a suitable weight 31 that is slidable on the shaft 15 below the housing plates 25, the links 29 thus serving to connect the weight 31 with the governor arms 28. Manifestly weight 31 normally tends to retain the arms 28 against the action of centrifugal force, inwardly between the plates 25. Manifestly, the governor will serve to control the speed of rotation of the shaft 15 in proportion to the flow of the water through the pipe 10.

Bolted or otherwise secured as at 32 to the plug 13 is a gear case 33 provided with a suitable, and in the the present instance, hinged lid 34. Secured to the underside of, and depending from the lid 34 is a suitable frame structure 35 in which is a conventional train of meter-gearing 36 which includes among other parts a pinion provided with a key 37. Also the gear train 36 includes a drive shaft 38 that extends through the lid 34 and is adapted to be connected with the index-arm or pointer of a conventional register equipped for indicating a water flow in terms of cubic feet or gallons. Since the specific water register is not of the essence of the present invention a more detailed showing and reference thereto are deemed unnecessary.

The drive shaft 15 has a reduced upper end 15a that works through a gland structure consisting of a stuffing box 39 threaded on the upper end of the casing 16; a packing washer 40 resting on the upper end of the casing 16, a packing 41 and a gland nut 42 the latter being threaded in the upper end of the box 39 and confining, with the washer 40, the packing 41 within the boxing 39.

Secured on the reduced end 15a of the drive shaft is a head 43, which as best shown in Figure 4 is provided with an eccentrically disposed pin 44 having bearing engagement with the aforementioned key 37 of the gear train.

From the above it will be apparent that as the shaft 15 is caused to rotate pin 44 engaging the key 37 will transmit drive from the shaft 15 to the gear train and from the gear train through the shaft 38 to the indicator part, such as for example the index-arm or pointer of a water meter assembly. Thus in this manner the flow of water through the pipe 10, housing 11 and pipe 12 may be measured in cubic feet or gallons, and when the device is used in conjunction with low pressure wells, the same will be found, due to the specific construction of the impeller and also of the governor, suitable for the registering of the quantity of water correctly at different positions of the wall valve.

In actual practice it has been found that with the helical fin or vane 21 of the impeller properly balanced no upward thrust or downward pull on the drive shaft is exerted when the well is flowing. Also, by providing the hard rubber bushing 17 for the shaft 15, and a reduction in diameter at the upper end 15a of said shaft friction is reduced considerably and, as is shown, a comparatively small stuffing box assembly may be employed while at the same time the gear box will be watertight.

The governor will also serve to retard the speed of the drive shaft when the valve of the well is fully open. In this connection it will be apparent that the arms 28 of the governor will tend to rise to substantially right angles to the drive shaft at high speed causing a friction in the water serving to retard the speed of the drive shaft. Thus, as the flow of the water is reduced, so is the speed of the drive shaft diminished, the arms of the governor gradually dropping down alongside the drive shaft causing less friction and thereby giving the impeller more power when the well flow is reduced. As a result a correct reading of the register will be obtainable when the flow of the water is reduced by closing the well valve.

It will also be understood that in actual practice any gear train can be used that is fitted with a drive arm, such as for example the key 37, and which does not have too much friction.

Also in using standard piping at 10, 11, and 12 an inexpensive housing is provided for the device to the end that the meter unit involving the features of the present invention is simple in installation and construction and will be economical in use.

While I have herein described and illustrated the invention as being adapted for use in measuring the flow of water from very low pressure wells, it will be understood that the invention may be used for the measurement of the flow of fluid of all character and that accordingly it is no wise intended to limit the invention to the use herein specifically set out, since the invention is highly adaptable for the measurement of other fluids including oil run from storage tanks at well locations into pipe lines as well as for the measuring of the flow of water from artesian wells as herein specified.

It is to be further understood that it is in no wise intended to limit the invention in the precise details of construction, combination and arrangement of elements other than may be required by the prior art and the scope of the claims hereunto appended.

Having thus described the invention, what is claimed as new is:

1. In a fluid meter, a housing through which fluid passes, a meter gearing train, means to support the meter gearing train, a vertical shaft operatively connected with the meter gearing train, a fluid operated impeller carried by the shaft, and a governor mounted on the shaft above said impeller, said governor comprising a pair of spaced complemental plates secured to the shaft, weight arms pivoted at their upper ends between said plates at diametrically opposite sides of the shaft, a weight member slidably mounted on the shaft between said plates and the impeller, and links operatively connecting said weight member with said weight arms; said plates having their respective opposite end portions of an edge contour corresponding somewhat to the edge contour of said weight arms and adapted to receive said weight arms therebetween when the governor is at rest, and with the weight arms substantially entirely concealed between said ends of the plates when the governor is at rest.

2. In a fluid meter, a housing through which fluid passes, a vertical operating shaft for the meter vertically disposed within said housing, a fluid operated impeller mounted on said shaft and a governor mounted on said shaft and consisting of a pair of spaced complemental plates secured to the shaft, weight arms pivoted at their upper ends between said plates at diametrically opposite sides of the shaft and normally concealed by said plates, a weight member slidably mounted on said shaft, and links operatively connecting said weight member with said weight arms.

HARRY R. ANDREW.